(No Model.) 4 Sheets—Sheet 3.
F. H. RICHARDS.
BUTTON FASTENER SETTING MACHINE.
No. 341,053. Patented May 4, 1886.
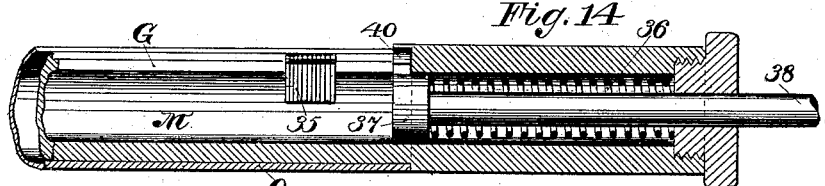
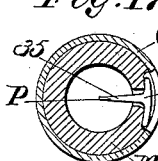 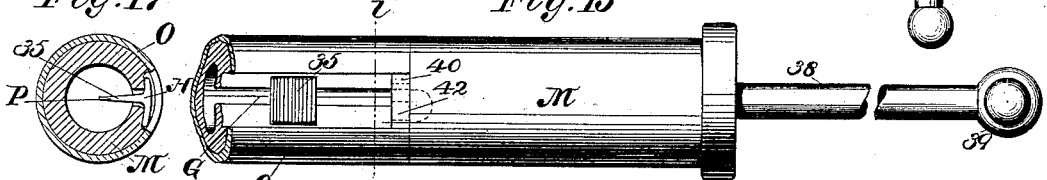
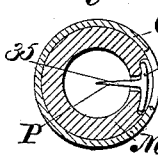 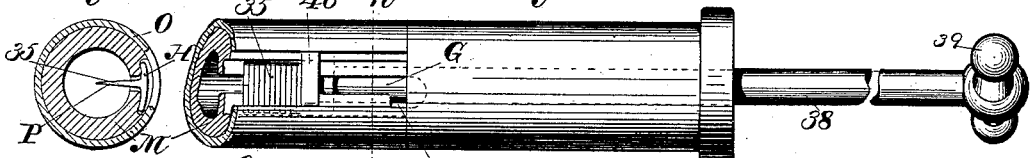
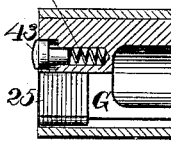 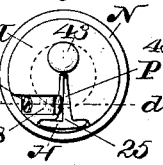 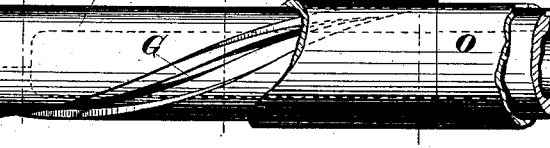
 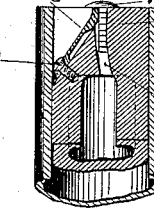 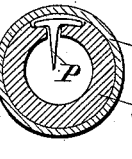 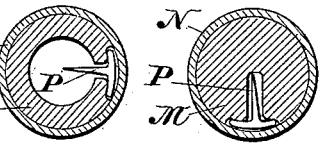
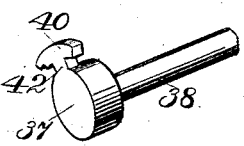  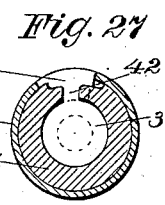
Witnesses:
Frank H. Pierpont
John Johnston
Inventor:
Francis H. Richards (No Model.) 4 Sheets—Sheet 4.

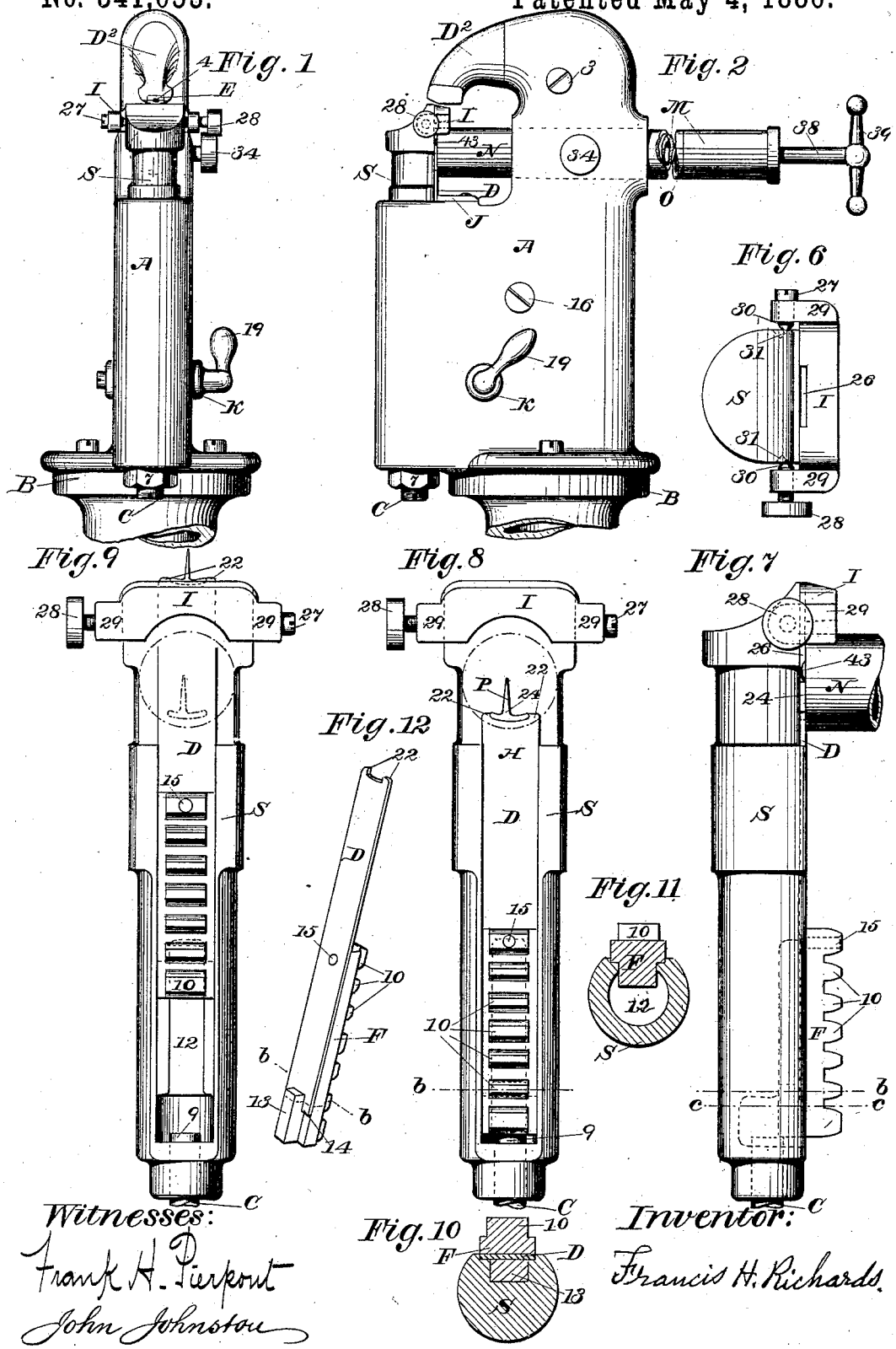

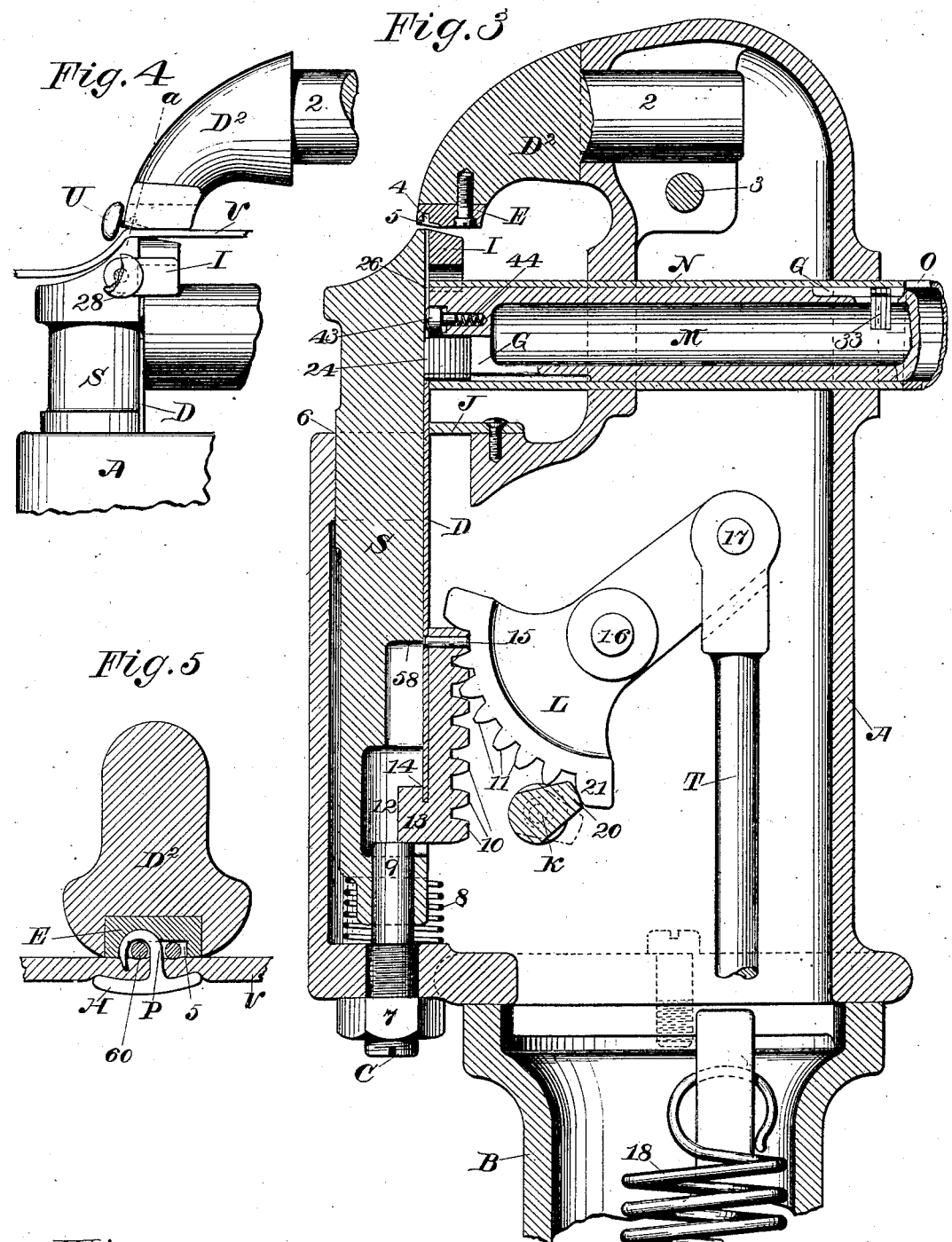

F. H. RICHARDS.
BUTTON FASTENER SETTING MACHINE.

No. 341,053. Patented May 4, 1886.

Witnesses:
Frank H. Pierpont
John Johnston

Inventor:
Francis H. Richards

UNITED STATES PATENT OFFICE.

FRANCIS H. RICHARDS, OF SPRINGFIELD, MASSACHUSETTS, ASSIGNOR TO THE AMERICAN BUTTON FASTENER COMPANY, OF NEW BRITAIN, CONN.

BUTTON-FASTENER-SETTING MACHINE.

SPECIFICATION forming part of Letters Patent No. 341,053, dated May 4, 1886.

Application filed September 9, 1885. Serial No. 176,598. (No model.)

*To all whom it may concern:*

Be it known that I, FRANCIS H. RICHARDS, a citizen of the United States, residing at Springfield, in the county of Hampden, State of Massachusetts, have invented certain new and useful Improvements in Button-Fastener-Setting Machines, of which the following is a specification.

This invention relates to improvements in machinery especially adapted for setting or inserting into shoe uppers or fabric that kind of button-fasteners known in the market as "Kempshall's One-Prong-Button Fasteners," and it is in the nature of an improvement on a machine for the same purpose described in United States Patent No. 311,033, granted to me January 20, 1885.

The invention has for its object to furnish a more convenient and efficient machine of its class; and it consists in the devices and combinations hereinafter set forth.

Figure 32:
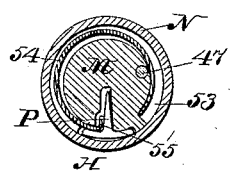
Figure 31:
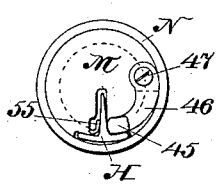
Figure 30:
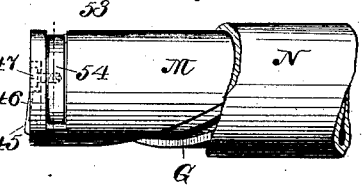
Figure 35:
Figure 33:
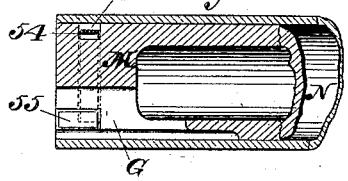
Figure 34:
Figure 36:
Figure 37:
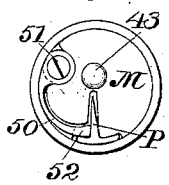
Figure 38:
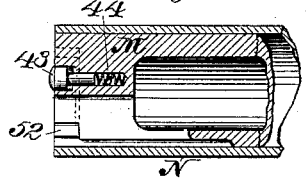
Figure 39:
Figure 41:
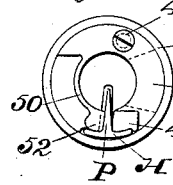
Figure 40:
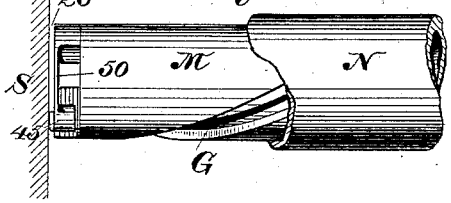
Figure 42:
Figure 44:
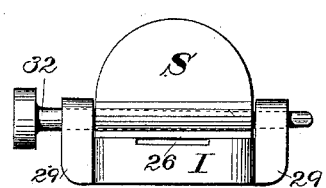
Figure 43:
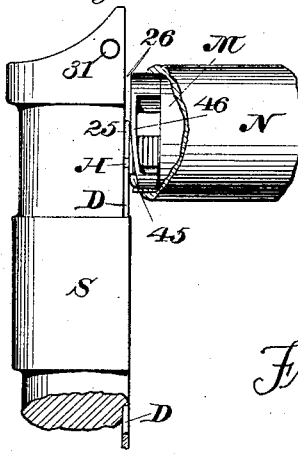
Figure 45:

In the drawings accompanying and forming a part of this specification, Figure 1 is a front elevation of a machine embodying my invention. Fig. 2 is a side elevation of the same. These two figures are drawn on a reduced scale. The remaining figures are approximately full size. Fig. 3 is a vertical section through the center of the machine from front to rear. Fig. 4 is a side view of the parts where the setting operation is performed, being an enlargement of a part of Fig. 2. Fig. 5 is a vertical transverse section through the setting-die in line $a$, Fig. 4. Fig. 6 is a top view of the slide and its cap. Fig. 7 is a side view of the same, showing also the front end of the magazine and the driver. Fig. 8 is a rear view of the slide, slide-cap, and driver, which last is here shown in its lower position. Fig. 9 is a similar view of the same parts, the driver being up. Fig. 10 is a section of the slide and driver in line $b\,b$, Figs. 7 and 8. Fig. 11 is a section of the same in line $c\,c$, Fig. 7. Fig. 12 is a perspective view of the driver. Fig. 13 is a side view of the complete magazine. Fig. 14 is a vertical longitudinal section of the rear part thereof. Fig. 15 is a top view of the same, the piston being locked back. Fig. 16 is a similar view of the same parts, the piston being unlocked and moved a short distance forward. Fig. 17 is a section drawn in projection to the left-hand end of Fig. 15, and Figs. 18 to 16. Fig. 19 is a side view of the front end of the magazine, a part of the case being removed. Fig. 20 is a front view of the front end of the magazine. Fig. 21 is a vertical longitudinal section of the extreme front end of the magazine. Fig. 22 is a side view of said front end, a part of the case being here broken away to show details. Fig. 23 is a horizontal section of the same in line $d\,d$, Fig. 20. Figs. 24, 25, and 26 are respectively sections of the magazine in lines $e\,f\,g$, Fig. 19. Fig. 27 is a section of the same in line $h$, Fig. 16. Fig. 28 is a similar section in line $i$, Fig. 15. Fig. 29 is a perspective view of the piston. Fig. 30 is a side view of the front end of the magazine having a detent-spring of a modified construction. Fig. 31 is a front view of this form of magazine. Fig. 32 is a section of the same in line $j$, Fig. 30. Fig. 33 is a vertical longitudinal section of the same. Fig. 34 is a perspective view of a detent-spring. Fig. 35 is a similar view of a spring-stop. Fig. 36 is a side view similar to Fig. 30 of another modification of the detent-spring. Fig. 37 is a front view of this form. Fig. 38 is a vertical longitudinal section of the same. Fig. 39 is a perspective view of this form of the spring. Fig. 40 is a side view similar to Figs. 30 and 36 of a third modification in the construction of the detent-spring and the spring-stop. Fig. 41 is a front view of this form drawn in projection to Fig. 40. Fig. 42 is a perspective view of the spring and stop, both being formed on the same piece. Fig. 43 is a side view of this form, showing how it operates in connection with the slide. Fig. 44 is a top view of the slide, showing a modification in the fastening of the slide-cap. Fig. 45 shows two views of the button-fastener above specified.

Similar characters designate the same parts in all the figures.

The frame of the machine is designated by A, and is supported on the top of a column or stand, B, or otherwise, as may be convenient. Said frame is preferably formed hollow, and has formed therein suitable places or bearings to receive the several details. At the upper end the frame is bored to receive the stem 2 of the die-holder $D^2$, which in this case is adjustably fixed by means of the clamping-screw 3, which screw holds stem 2 by springing the partially-divided frame firmly thereon. Said holder at its front end is fitted to receive a die-block, E, having the setting-die proper, 4, formed therein on the under side near its extreme front end. As herein shown, the die-block is also formed to receive the button-shank, as at 5, Figs. 3 and 5. This is desirable but not necessary.

Immediately below the setting-die 4 is placed a vertical slide, S, the back side of which at the right hand in Fig. 3 is flat and closely coincides with the front of said die. Said slide has its upper bearing in the frame at 6, and its lower bearing on the upper end, 9, of screw C, which screw is fixed in the bottom of the frame, as shown in Fig. 3. A check-nut, 7, may be used when necessary to hold the screw from accidental displacement.

In using the machine the slide is slid downward by the operator, who presses on the upper end when putting fabric between it and the die, it being held up by some suitable spring, as 8, here interposed between its lower end and the frame.

D designates the driver, which lies against the back of slide S and is a flat piece, usually of steel, about the thickness of the fasteners to be set with the machine. At its lower end said driver is furnished with means for imparting thereto a vertical reciprocating movement, which said means here consist of rack-teeth 10, that mesh with similar teeth, 11, on lever L. The downward movement of the driver is limited by screw C, the point 9 of which projects through into a recess, 12, formed in the slide, and strikes a projection, 13, on the front of the driver, which projection also limits the upward movement of the driver by striking against shoulder 58 on slide S.

For convenience and economy of manufacture, and to permit the use for making each part of the driver of a material specially adapted therefor, the said driver is formed in two parts, D and F. Part D is usually made of steel and tempered at the upper end or throughout, while part F may be made of cast or malleable iron. The two parts are securely fastened together by making a notch at 14 in part F to receive the lower end of part D, the upper end being held by a rivet, (or screw,) 15. Lever L, whereby the driver is operated, is pivoted to the frame in the usual way at 16, and is operated by a treadle-rod, T, pivoted to said lever at 17. This rod, of which only the upper end is shown, is supposed to extend down through spring 18, whereby it is drawn upward to a treadle, whereby it is drawn downward.

For locking the machine so as to prevent its misuse by meddlers I have provided a stop-key, K, operated by handle 19. Within the frame this key has a projection, 20, which by the turning of the key may be thrown in front of a tooth, as 21, of the lever, as shown in Fig. 3, the dotted lines showing the unlocked position. If for any reason it is deemed preferable, the key may be arranged in a reverse position to that shown, so that projection 20 shall act against one of the teeth, 10, of the driver. It is obviously immaterial as to the operation of the key whether it is placed in one or the other of those positions.

The upper end of the driver is formed with two lips, 22, which, during the setting operation, inclose the ends of the bar-shaped head H of the T-shaped fastener, which is shown in Fig. 45 and in several other figures. The object of said lips is to prevent the lateral displacement of the fastener by the sidewise pressure of the die 4 during said operation. A cap, J, is provided to hold the driver-point against the slide and prevent any turning of the slide in frame A.

In Figs. 3, 7, and 8 the driver is shown standing in its lower position, with a fastener, 24, placed above it, ready to be driven up against the setting-die. For supplying fasteners to said position 24, there is fixed in the machine, in a horizontal position, a magazine, M, hereinafter described, which terminates at the rear side of the driver, and thus forms, between itself and slide S, a driver-channel, 26, corresponding to the thickness of the fastener. Said channel is continued up to the top of slide S by means of a notch in a slide-cap, I, which cap is removably secured to said slide by means of screws 27 28, which pass through ears 29, and have conical points 30 entering (slightly eccentrically) conical depressions 31, (see Fig. 6,) formed in the slide. Another way of securing the cap to the slide is clearly shown in Fig. 44, where a long tapered pin, 32, extends entirely through the slide and ears 29. The object in either case is the same, to furnish a convenient means of removing from the driver-channel any imperfect fasteners that may accidentally get into the machine.

The magazine has as its principal part the central tube, M, which, with the exception of being hollow, is substantially the same as the grooved rod so designated in my aforesaid Letters Patent. Said tube has a T-shaped groove corresponding to the fasteners to be supplied thereto, which groove G, rearward of frame A, extends along the top of the tube and then takes a spiral course (see Figs. 19, 30, and 40) forward to the driver-channel, so that fasteners put in prongs down at 33 are inverted and reach said channel prongs up, as at 24, Fig. 3. The front end of the magazine-tube is inclosed in a tubular case, N, fixed thereto, which case is removably fixed in frame A, passing through holes in the front and rear walls thereof, (see Fig. 3,) and being held therein by a set-screw, 34, Figs. 1 and 2. Said case serves to hold the fasteners from displacement while passing through the spiral part of groove G. Rearward of case N the magazine has a slotted tube, O, which is employed to lock a supply of fasteners into groove G. When the slot coincides with said groove, as in Figs. 15, 17, and 28, a row of fasteners may be placed therein, as at 35, Figs. 14 and 15, and by then turning this tube the fasteners are securely held in place by one edge of said tube reaching over their heads, as in Figs. 16 and 18.

Back of tube O the magazine is extended to receive a spring, 36, Fig. 14, for holding forward the fasteners in groove G. This spring acts directly against a piston, 37, which presses forward the fasteners and is operated by hand by rod 38 and handle 39. Said piston is provided with an upwardly-projecting wing, 40, of the size and shape of groove G and the slot in tube O, to secure a proper bearing of the piston against the fasteners and furnish a means for operating tube O. This is done as follows: At one side of groove G, and at its extreme rear end, there is formed the notch 41. When the piston is drawn clear back, as in Figs. 14 and 15, the neck 42, Figs. 27 to 29, of wing 40 will, on the turning of the piston, fit into said notch, as in Figs. 15 and 28, and thus lock the piston back; and as wing 40 just fills the width of the slot in tube O, said wing will at the same time turn said tube from its closed position shown in Figs. 16, 18, and 27, to its open position shown in Figs. 15, 17, and 28. A supply of fasteners, 35, being now placed in groove G, the piston is turned out of engagement with said notch 41, when spring 36 pushes it and the fasteners forward in said groove.

It has been found in practice that the vertical movement of slide S, while placing and removing fabric, has a tendency to work the fastener in position 24 up away from the driver and interfere with the proper action of the machine. To obviate that tendency I provide some suitable form of spring-stop, placed immediately above the fastener in the front end of tube M. One form of this stop is shown at 43 in Figs. 2, 3, 7, 19, 20, 21, 22, 37, and 38. As there shown, it consists in a round sliding plug, oval shaped on its outer end, and forced out against slide S (see Fig. 3) by spring 44, or by other and equivalent means. This device effectually prevents the fastener moving up, except as forced by the driver.

It should be understood that the construction of this spring-stop can be modified in many ways without departing from the spirit of my invention. In Figs. 30, 31, and 35 I have shown one such modification, arranged to act against the head instead of the point of the fastener. In this form the stop 45 is formed at one end of a flat spring, 46, which is let into a recess formed in tube M, (see Fig. 31,) and secured there by screw 47. This form of stop is supposed to be, like the other, slightly oval on its projecting surface, and it operates, with the exception noted, in precisely the same way.

There is in practice sometimes occasion for removing the magazine from the machine while it is loaded with fasteners, either to replace it with one supplied with a different size, or otherwise. This may be readily done by simply loosening screw 34; but it is necessary to first lock back the piston, as hereinbefore explained, otherwise it will drive all the fasteners forward into or through the spiral groove; and it is desirable also to have some means for holding those at 25, Figs. 20, 21, from tumbling out the front end of said groove. For preventing this result I have provided a detent-spring, 48, to bear against one side of the fastener-prong, as shown in Figs. 20, 22, and 23. This spring may be held in place by screw 49, or by any other convenient means, and should be stiff enough to hold a magazine full of fasteners, yet offer slight resistance to spring 36.

As remarked above respecting the spring-stop, this detent-spring may be constructed in many ways. In Figs. 36 to 39 I have shown one modification, in which the spring 50 is curved and lies in a similarly-shaped recess in the end of tube M, being held therein by screw 51, and having a point, 52, bearing against the fastener-prong. (See Fig. 37.)

In Figs. 30 to 34 I have shown another form of this spring. Here a groove, 53, is formed in tube M near its front end. A spring, 54, is sprung into that groove, and is provided with a point, 55, reaching forward even with the front end of the magazine. This form, like the preceding, operates precisely the same as the first form described—to wit, by pressure on the side of the fastener-prong, and any other construction or arrangement of said spring which thus operates I consider identical with these as an element of the combinations hereinafter claimed.

Thus far in the description I have treated the spring-stop and detent-spring as separate devices operating independently; but they may be constructed together and yet operate as before. In Figs. 40 to 43 I have illustrated one such way of constructing them. Here the spring-stop is the same as shown in Figs. 30, 31, and 35, above described, and the detent-spring is similar to that shown in Figs. 36 to 39. For this reason I have for convenience here designated the several portions of these parts by the same characters as in the preceding figures.

By comparing Figs. 41, 42 it will be seen the detent-spring 50 is practically an extension of the spring-stop, the entire piece being contained in an annular chamber in the end of the magazine. It is obvious the operation of both devices is not at all changed by their combination.

The operation of the spring-stop is specially illustrated in Fig. 43, where driver D has moved up slightly, forcing the head H of fastener 25 up past said stop, which rests against the driver.

The operation of my invention, especially the operation of the details, will be readily understood from the drawings and preceding description. When the machine is to be used, the operator first sees that the magazine is supplied with the button-fasteners, then turns the key K to unlock the driver, pushes down slide S, and properly places thereon the material V, to which buttons are to be attached. A button, U, Fig. 4, is then placed with its shank 60, Fig. 5, in notch 5. Rod T is now drawn down, throwing up the driver and forcing a fastener from position 24 up through channel 26 until its point strikes in die 4, and is bent over into a hook through the button-shank, as shown in Fig. 5. This setting operation being completed, the driver is returned to its lowest position, spring 36 forces a fastener past the detent-spring into channel 26, and the machine is ready for setting another button.

Having thus described my invention, I claim—

1. The combination, in a button-fastener-setting machine having a driver-channel substantially as described, of a driver, a grooved magazine, substantially as described, supplying fasteners to said channel above the driver, and a spring-stop located above the groove of said magazine and projecting into said channel, substantially as set forth, and for the purpose specified.

2. The combination of slide S and magazine M, grooved substantially as described, having between them channel 26, driver D, spring-stop 43, located above the groove of said magazine, and a spring for operating said stop, all constructed and arranged to operate substantially as set forth.

3. In a button-fastener-setting machine, the combination of magazine M, having groove G and detent-spring 43, adapted to bear against fasteners in said groove, substantially as set forth.

4. In a button-fastener-setting machine, the combination of slide S and slide-cap I, having ears 29, which are provided with means substantially as described whereby said cap is held against said slide, substantially as set forth.

5. In a button-fastener-setting machine, the combination of slide S, having depression 31, cap I, having ears 29, and conical-pointed screws 27 28, substantially as set forth.

6. The combination, with a frame-work, of screw C, adjustably fixed in said frame, and having point 9, slide S, having its upper bearing in said frame-work, and its lower bearing on said screw-point, and driver D, sliding in said slide and having its downward stroke stopped by said point, substantially as set forth.

7. The combination of a reciprocating driver, gearing, substantially as described, for operating said driver, and a stop-key acting in connection with said gearing to lock said driver, substantially as set forth.

8. The combination of tube M, having groove G, slotted tube O, piston 39, having wing 40, spring 36, and means, substantially as described, for drawing back and for turning said piston, and thereby said tube O, substantially as set forth.

9. The combination of tube M, having groove G and notch 41, slotted tube O, a piston fitting the said tube M, the groove G, and the slot of tube O, substantially as described, and means, substantially as described, for sliding said piston and turning it into and out of said notch, substantially as set forth.

In testimony whereof I have hereunto signed my name this 4th day of September, A. D. 1885.

FRANCIS H. RICHARDS.

Witnesses:
FRANK H. PIERPONT,
ROBERT L. PECK.